US005205941A

United States Patent [19]

Funk et al.

[11] Patent Number: 5,205,941

[45] Date of Patent: Apr. 27, 1993

[54] FEEDING EQUALIZATION FOR SLUDGE PRESSES

[75] Inventors: Erwin Funk; John Bolles; John Baldwin, all of Glens Falls, N.Y.

[73] Assignee: Kamyr, Inc., Glens Falls, N.Y.

[21] Appl. No.: 739,472

[22] Filed: Aug. 2, 1991

[51] Int. Cl.[5] .............................................. B01D 33/64

[52] U.S. Cl. .................................... 210/770; 210/780; 210/456

[58] Field of Search ............... 210/456, 780, 350, 388, 210/351, 403, 359, 770, 771

[56] References Cited

U.S. PATENT DOCUMENTS 4,214,990 7/1980 Joh ................................. 210/456 X 4,534,868 8/1985 Barbulescu et al. ................ 210/780

OTHER PUBLICATIONS

Kamyr, Inc. Bulletin No. KGD1804-MEO189 "Ring ® Press Information Guide"; admitted prior art.

*Primary Examiner*—Frank Spear

*Attorney, Agent, or Firm*—Nixon & Vanderhye

[57] ABSTRACT

In a dewatering press having a number of rotors rotatable in a cylindrical press housing with an inlet channel defining an inlet for a humid mass into the housing, a mechanism for equalizing the amount of mass fed to the inlet channels. A screw feeder is associated with each inlet channel, and equalization is accomplished by providing opening communication between the screw feeders at their pressure ends, adjacent the inlet channels. A module having a conduit associated with each inlet channel, and a cross over tunnel at the portion of the module adjacent the press housing, is disposed between the feeder screw housing and the press housing.

20 Claims, 2 Drawing Sheets

FIG. 1
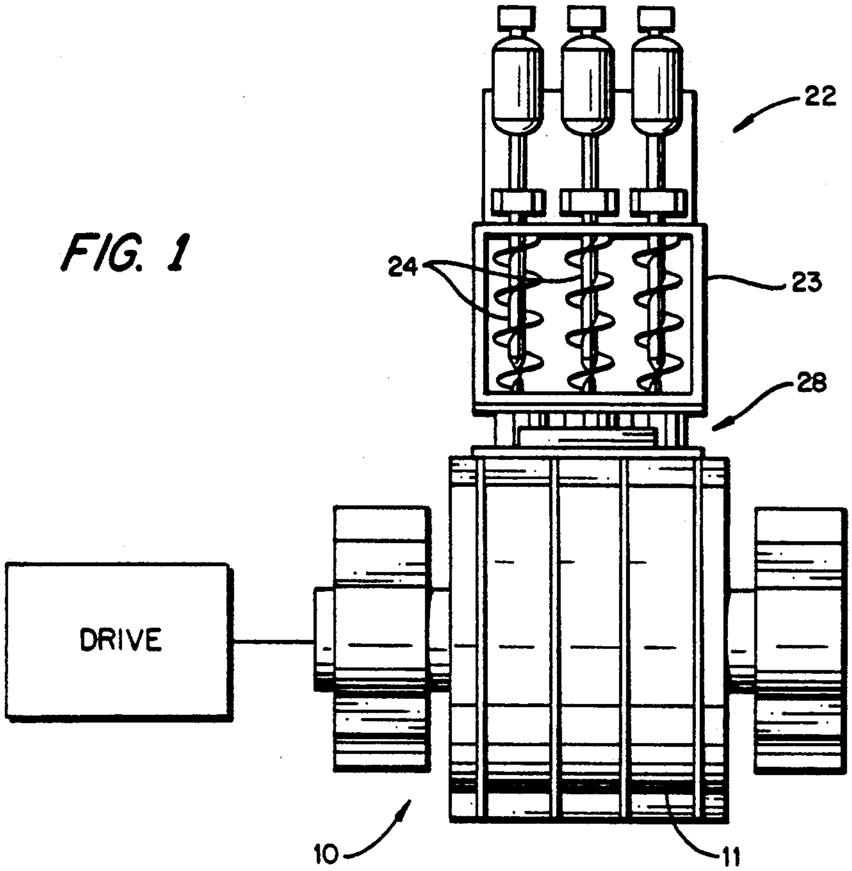
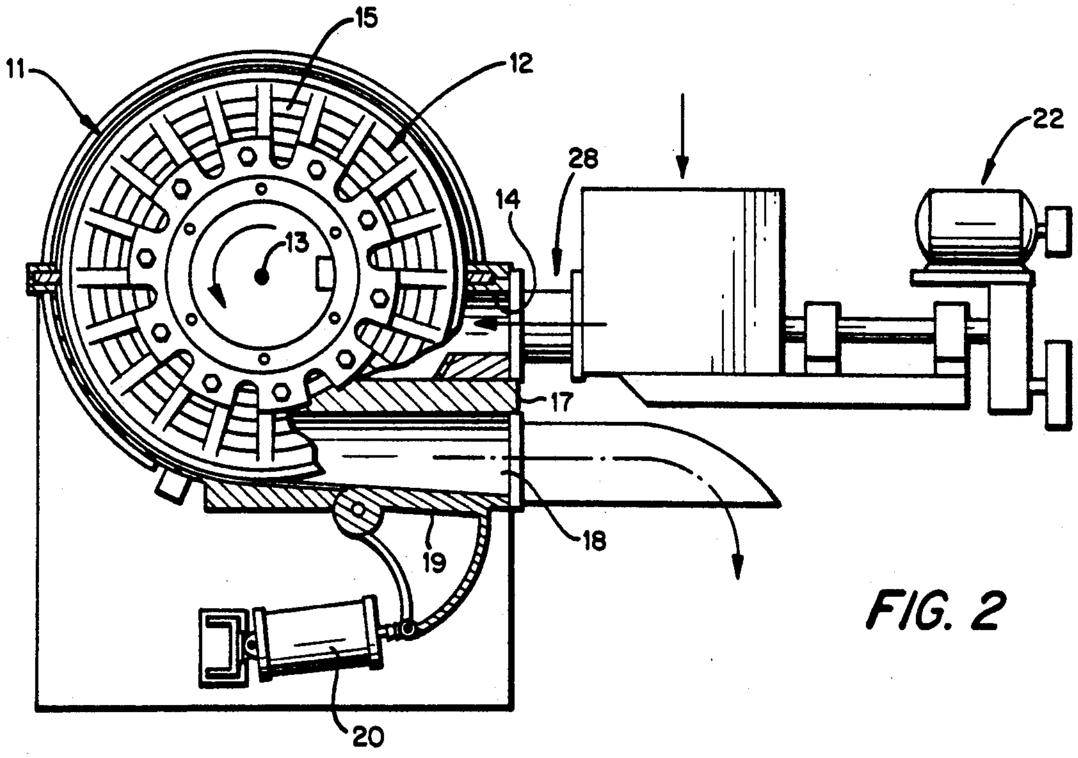
FIG. 2

FEEDING EQUALIZATION FOR SLUDGE PRESSES

BACKGROUND AND SUMMARY OF THE INVENTION

An extremely versatile and successful commercial press for dewatering suspension is the press sold by Kamyr, Inc. of Glens Falls, N.Y. under the trademark RING ®. The basic operating theories and components of the press are described in U.S. Pat. No. 4,534,868. Such a press may be used as a single channel press, or may have a plurality of channels, either a number of channels formed in a single rotor, or multiple rotors with channels between the rotors or in each rotor. The rotor channels are all rotatable about a common axis of rotation.

While multi-channel RING ® presses are very useful and versatile, in some circumstances where they are force fed—as with screw feeders—there can be a tendency for one of the channels to be over fed, resulting in a final product which has not been dewatered to the extent necessary (e.g. no dry sludge cake when sludge is being dewatered).

The problem of overfeeding the channel with a screw feeder is solved according to the present invention by providing a means for equalizing the amount of mass fed to the channels (by equalizing the inlet pressure to the channels), the equalizing means disposed just exteriorly of the press housing at the pressure ends of the screw feeders.

In a preferred embodiment, the equalizing means comprises a module disposed between a housing for the screw feeders and the cylindrical press housing. The module comprises first and second plates, extending generally parallel to the axis of rotation of the rotors, and generally perpendicular to the direction of transport of humid mass by the screw feeders. A plurality of tubular conduits are disposed between the plates, each conduit connecting a channel to a screw feeder. The first plate is connected to the press housing and the second plate connected to the screw feeders housing. And, means are provided defining a cross over tunnel extending between each of the conduits, the cross over tunnel connected to the first plate. Each of the conduits is preferably generally circular in cross-section, and the cross over tunnel is generally quadrate in cross-section.

The invention also contemplates a method of dewatering a humid mass, particularly a method of dewatering sludge. The method comprises the steps of: (a) Positively feeding under substantial pressure the humid mass to each of a plurality of inlets to each of a plurality of annular channels as a continuous stream, each of the annular channels having perforations (in a screen liner) in at least a working section thereof. (b) Creating an axial pressure at the interior of the humid mass. (c) Continuously moving movable side wall sections of the annular channels rotationally about the axis along at least the working sections, the movable side wall sections each having a surface area greater than the surface area of the remaining side wall sections of the annular channels whereby to continuously displace the mass toroidally along at least the working sections and to generate between the movable side wall sections and the humid mass a dynamic friction force thereby creating a pressure which is inferior to the axial pressure whereby to create between the side wall section and the humid mass a low pressure zone which causes the liquid in the liquid mass to be displaced transversely to the direction of travel of the humid mass and to flow out of the annular channels through the perforations. (d) Continuously discharging the mass which contains only a small percentage of liquid at an outlet ends of the annular channels. And, (e) equalizing the amount of the humid mass fed to the annular channels at the inlets so as to minimize the chance that one annular channel will be overfed and will not produce a discharged mass with as small a percentage of liquid as desired.

It is the primary object of the present invention to provide a simple and effective apparatus and method for equalizing the amount of mass fed to the channels of a multi-channel "RING" ® press. This and other objects of the invention will become clear from an inspection of the detailed description of the invention and from the appended claims.

BRIEF DESCRIPTION OF THE DRAWINGS

FIG. 1 is a top view of an exemplary apparatus according to the present invention;

FIG. 2 is a side view of the apparatus of FIG. 1 with the end wall of the press housing cut away;

DETAILED DESCRIPTION OF THE DRAWINGS

Figure 5:
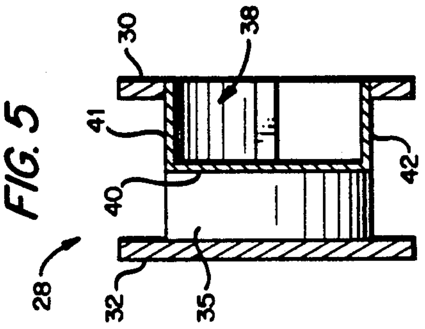
FIG. 5 is a cross-sectional view taken along lines 5—5 of FIG. 4.

Exemplary apparatus according to the present invention is shown generally by reference numeral 10 in FIGS. 1 and 2. The apparatus comprises a conventional type of press for dewatering suspension, with a pressure/flow equalizer for the inlet of suspension into the press. Preferably the press comprises the type of press sold by Kamyr, Inc. of Glens Falls, N.Y. under the trademark "RING" ®, which is described in general terms in U.S. Pat. No. 4,534,868 (the disclosure of which is hereby incorporated by reference herein), and also described in Kamyr, Inc. Bulletin No. KGD1804-ME0189 entitled "RING ® Press Information Guide", the disclosure of which is also incorporated by reference herein.

The major elements of the "RING ®" press are a cylindrical press housing 11, a plurality of rotors 12 rotatable in the housing 11 about a common (preferably horizontal) axis 13 (see FIG. 2), and a channel 14 defining an inlet for a humid mass into the housing 11 for each of the rotors 12. Each of the rotors 12 is constructed with a screen liner lining an annular channel therein, the screen liner being shown generally by reference numeral 15 in FIG. 2. The screen liner 15 allows liquid from the humid mass within an annular channel to pass outwardly from the rotor and ultimately outwardly of the press housing 11.

Other conventional components of a "RING" ® press include a doctor blade 17, an outlet 18 associated with each rotor for discharge of a dewatered mass, and a restrictor plate 19 associated with each outlet 18, and movable under the influence of an actuator such as hydraulic cylinder 20. The discharge is just below the inlet channel 14 for each of the rotors 12, and just past the outlet 18 in the direction of rotation (see the arrow in FIG. 2) of the rotors 12.

There are many situations in which it is desirable to provide a screw feed for the channels 14. This is particularly so when the humid mass to be dewatered is sludge, although screw feeds can be used with other suspensions, such as suspensions of cellulosic fibers. A conventional screw feeder is shown generally by reference numeral 22 in FIGS. 1 and 2, and comprises a housing 23 having a plurality of feed screws 24 associated therewith, one feed screw for each channel 14, and a drive motor 25 for each of the feed screws 24. The feed screws 24 extend in a dimension essentially perpendicular to a vertical plane containing the axis of rotation 13.

In order to prevent one of the channels 14 from being overfed by the screw feeders 22, according to the present invention means are provided for equalizing the amount of mass fed to the channels 14, by generally equalizing the pressure. This feeding/pressure equalizing means is shown generally by reference numeral 28 in FIGS. 1 through 5 and preferably comprises a module disposed just exteriorly of the press housing 11 at the pressure ends of the screws 24 (the ends most remote from the motors 25).

Figure 3:
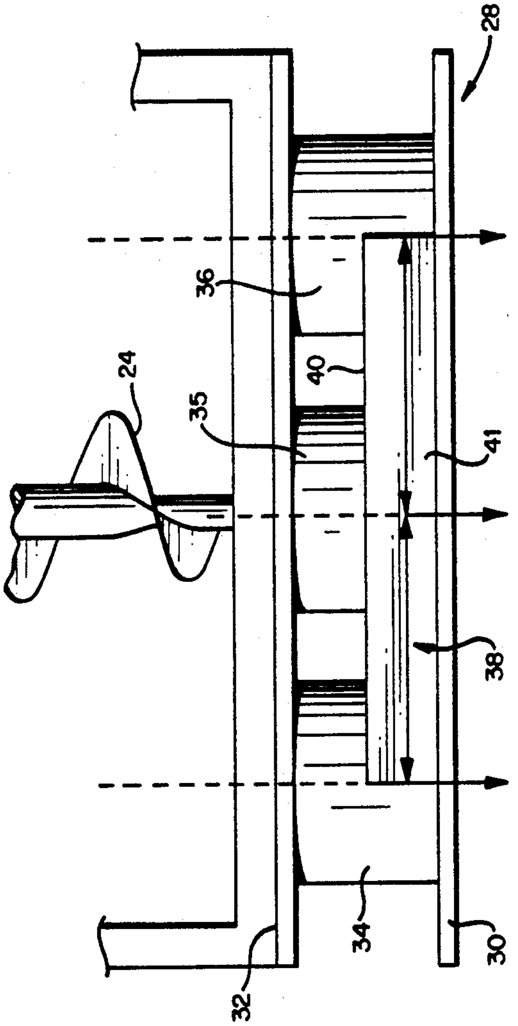
FIG. 3 is a top plan view of a module utilized with the apparatus according to the invention.
Figure 4:
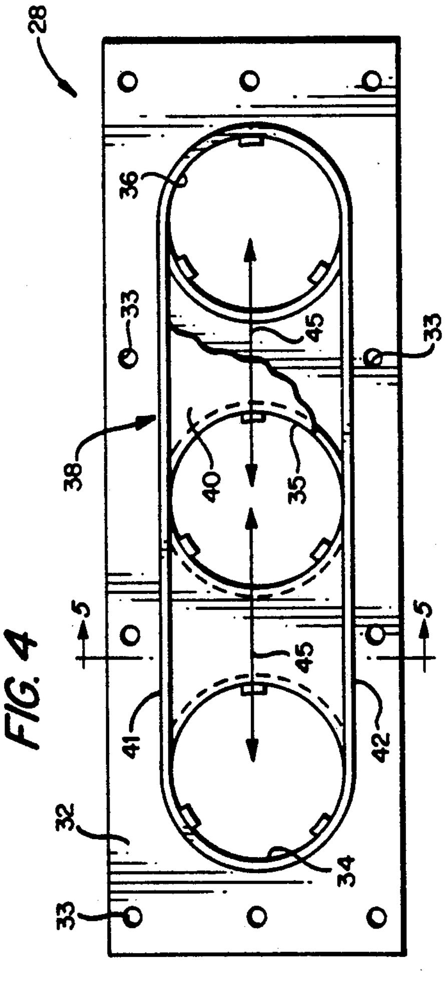
FIG. 4 is an end view of the module of FIG. 3 with the near side plate removed for clarity of illustration.

A preferred equalizing means 28 according to the present invention is seen most clearly in FIGS. 3 through 5. The module 28 comprises a first plate 30 and a second plate 32, the plates 30, 32 preferably being essentially parallel to each other, and generally parallel to the axis of rotation 13. Typically the planes of the plates 30, 32 are generally vertical. The first plate 30 is bolted or otherwise affixed to the press housing 11, while the second plate 32 is bolted or otherwise affixed to the screw feeder housing 23. Bolt holes 33 (see FIG. 4) may be provided in each of the plates 30, 32 for facilitating bolting.

The module 28 also comprises a plurality of tubular conduits 34 through 36 extending between and through the plates 30, 32 and generally perpendicular thereto. The conduits 34 through 36 are preferably generally circular in cross-section as seen in FIGS. 4 and 5 and one conduit 34–36 is associated with each channel 14 (and thus each screw 24). In order to provide feed/pressure equalization so that one of the channels 14 is not overfed, means are provided defining a tunnel—shown generally by reference numeral 38—openly connecting the conduits 34 through 36 at the ends thereof closest to the channels 14. The tunnel 38 is preferably operatively connected to plate 30; in fact the plate 30 may form one side wall of the tunnel 38, the tunnel 38 also having an opposite side wall 40, a top wall 41, and a bottom wall 42. The ends of the tunnel 38 are defined by the surfaces of the conduits 34, 36. The tunnel 38 is preferably quadrate (e.g. rectangular) in cross-section. The tunnel 38 allows free flow of suspension (e.g. sludge). The module 28 may be easily retrofit onto an existing RING® press.

While the invention has been described with respect to three channels 14, it is of course understood that any number of channels may be provided. The number of channels is typically 2–4 for most commercial situations.

The invention also contemplates a method of continuously extracting liquid from a humid mass, particularly sludge, by pressurization of the mass. The method comprises the steps of: (a) Positively feeding under substantial pressure the humid mass to each of a plurality of inlets 14 to each a plurality of annular channels as a continuous stream, each of the annular channels having perforations (in liners 15) in at least a working section thereof. (b) Creating an axial pressure at the interior of the humid mass. (c) Continuously moving a movable side wall section (15) of the annular channels rotationally about the axis along at least the working sections, the movable side wall section having a surface area greater than the surface area of the remaining side wall section of the annular channel whereby to continuously displace the mass toroidally along at least the working sections and to generate between the movable side wall sections and the humid mass a dynamic friction force thereby creating a pressure which is inferior to the axial pressure whereby to create between the side wall sections and the humid mass a low pressure zone which causes the liquid in the liquid mass to be displaced transversely to the direction of travel of the humid mass and to flow out of the annular channels through the perforations (in 15). (d) Continuously discharging the mass which contains only a small percentage of liquid at an outlet ends (18) of the channels. And, (e) equalizing the amount of the humid mass fed to the annular channel through inlets 14 so as to minimize the chance that one annular channel will be overfed and will not produce a discharged mass with as small a percentage of liquid as desired.

As will be readily seen, in a simple and effective manner a conventional press, fed with humid mass at consistencies of between 3–35% to produce dried sludge cake, or other dewatered mass, having a consistency of about 40–50%, has been provided which equalizes the flow/pressure among the inlet channels so as to prevent overfeeding of the rotor annular channels. While the invention has been herein shown and described in what is presently conceived to be the most practical and preferred embodiment it will be apparent to those of ordinary skill in the art that many modifications may be made thereof within the scope of the invention, which scope is to be accorded the broadest interpretation of the appended claims so as to encompass all equivalent apparatus and methods.

What is claimed is:

1. Apparatus for extracting liquid from a humid mass, comprising:

a cylindrical press housing;

a plurality of annular rotor channels rotatable in said housing about a common axis;

an inlet channel defining an inlet for a humid mass into said housing for each of said rotors;

a screen liner associated with each of said annular rotor channels allowing liquid from the humid mass within a rotor channel to pass outwardly from the rotor, and ultimately outwardly of the press housing;

a liquid outlet from said press housing, and a mass outlet from said press housing;

a screw feeder associated with each inlet channel for feeding humid mass to each inlet channel, each screw feeder having a pressure end; and means for equalizing the amount of mass fed to said inlet channels, said means disposed just exteriorly of said press housing at the pressure ends of said screws.

2. Apparatus as recited in claim 1 wherein said equalizing means comprises a module disposed between a housing for said screw feeders and said cylindrical press housing.

3. Apparatus as recited in claim 2 wherein said module comprises first and second plates, extending generally parallel to the axis of rotation of said rotors, and generally perpendicular to the direction of transport of humid mass by said screw feeders;

a plurality of tubular conduits disposed between said plate, each conduit connecting an inlet channel to a screw feeder; said first plate connected to said press housing and said second plate connected to said screw feeders housing; and means defining a cross over tunnel extending between each of said conduits, said cross over tunnel connected to said first plate.

4. Apparatus as recited in claim 3 wherein each of said conduits is generally circular in cross-section, and wherein said cross over tunnel is generally quadrate in cross-section.

5. Apparatus as recited in claim 1 wherein said mass outlet from said press housing includes a restrictor plate and means for applying a load to said restrictor plate.

6. Apparatus as recited in claim 5 wherein said equalizing means is disposed just vertically above said mass outlet from said housing, and just past said restrictor plate in the direction of rotation of said rotors.

7. Apparatus as recited in claim 6 wherein said equalizing means comprises a module disposed between a housing for said screw feeders and said press housing.

8. Apparatus as recited in claim 7 wherein said module comprises first and second plates, extending generally parallel to the axis of rotation of said rotors, and generally perpendicular to the direction of transport of humid mass by said screw feeders;

a plurality of tubular conduits disposed between said plate, each conduit connecting an inlet channel to a screw feeder; said first plate connected to said press housing and said second plate connected to said screw feeder housing; and means defining a cross over tunnel extending between each of said conduits, said cross over tunnel connected to said first plate.

9. Apparatus as recited in claim 3 wherein each of said conduits is generally circular in cross-section, and wherein said cross over tunnel is generally quadrate in cross-section.

10. A press for dewatering liquid suspensions, comprising:

a cylindrical press housing;

a plurality of annular rotor channels rotatable in said housing about a common axis;

an inlet channel defining an inlet for a humid mass into said housing for each of said rotors;

a screen liner associated with each of said rotor channels allowing liquid from the humid mass within a rotor channel to pass outwardly from the rotor, and ultimately outwardly of the press housing;

a liquid outlet from said press housing, and a mass outlet from said press housing;

a screw feeder associated with each inlet channel for feeding humid mass to each inlet channel, each screw feeder having a pressure end;

said screw feeders disposed in a housing; and a module disposed between said screw feeder housing and said cylindrical press housing at said inlet channels, said module comprising a first plate connected to said cylindrical press housing and a second plate connected to said screw feeder housing, said plates being generally parallel to the axis of rotation of said rotors; a plurality of conduits, extending between said first and second plates, one conduit being provided associated with each screw feeder and its associated inlet channel; and means defining a cross over tunnel for providing communication between said conduits, said cross over tunnel disposed in operative association with said first plate.

11. Apparatus as recited in claim 10 wherein each of said conduits is generally circular in cross-section and wherein said cross over tunnel is essentially quadrate in cross-section.

12. Apparatus as recited in claim 10 wherein said mass outlet from said press housing includes a restrictor plate and means for applying a load to said restrictor plate.

13. Apparatus as recited in claim 11 wherein said mass outlet from said press housing includes a restrictor plate and means for applying a load to said restrictor plate.

14. Apparatus as recited in claim 11 wherein said module is disposed just above said press outlet from said press housing.

15. Apparatus as recited in claim 12 wherein said module is disposed just above said press outlet from said press housing.

16. A method of continuously extracting liquid from a humid mass by pressurization of said mass, said method comprising the steps of:

(a) positively feeding under substantial pressure the humid mass to each of a plurality of inlets to each of a plurality of annular channels as a continuous stream, each of the annular channels having perforations in at least a working section thereof;

(b) creating an axial pressure at the interior of said humid mass;

(c) continuously moving movable side wall sections of the annular channels rotationally about the axis along at least said working section, the movable side wall section having a surface area greater than the surface area of the remaining side wall sections of the annular channels whereby to continuously displace the mass toroidally along at least the working sections and to generate between the movable side wall sections and the humid mass a dynamic friction force thereby creating a pressure which is inferior to the axial pressure whereby to create between the side wall sections and the humid mass a low pressure zone which causes the liquid in said liquid mass to be displaced transversely to the direction of travel of the humid mass and to flow out of said conduit through the perforations;

(d) continuously discharging the mass which contains only a small percentage of liquid at an outlet end of the annular channels; and (e) equalizing the amount of the humid mass fed to the annular channels at the inlets so as to minimize the chance that one annular channel will be overfed and will not produce a discharged mass with as small a percentage of liquid as desired.

17. A method as recited in claim 16 wherein step (e) is practiced by providing open communication between the inlets to the annular channels.

18. A method as recited in claim 16 wherein the humid mass is sludge, and wherein steps (a)-(e) are practiced to discharge a dry sludge cake as the discharged mass.

19. A method as recited in claim 18 wherein step (a) is practiced by feeding each conduit with a feeder screw.

20. A method as recited in claim 16 wherein step (a) is practiced by feeding each conduit with a feeder screw.

* * * * *